US008517811B2

(12) United States Patent
Pollard et al.

(10) Patent No.: US 8,517,811 B2
(45) Date of Patent: Aug. 27, 2013

(54) METHOD OF PLAYING A LOTTERY GAME INCLUDING A GROUP-BASED SECOND CHANCE GAME

(75) Inventors: Douglas Pollard, Winnipeg (CA); Jennifer Westbury, Winnipeg (CA); Nancy Bettcher, Winnipeg (CA); Riva Richard, Winnipeg (CA); Lyle Scrymgeour, Oakbank (CA)

(73) Assignee: Pollard Banknote Limited Partnership, Winnipeg, MB (CA)

( * ) Notice: Subject to any disclaimer, the term of this patent is extended or adjusted under 35 U.S.C. 154(b) by 0 days.

(21) Appl. No.: 13/304,584

(22) Filed: Nov. 25, 2011

(65) Prior Publication Data

US 2012/0122538 A1 May 17, 2012

Related U.S. Application Data

(63) Continuation-in-part of application No. 12/783,791, filed on May 20, 2010, now abandoned.

(60) Provisional application No. 61/180,968, filed on May 26, 2009, provisional application No. 61/512,262, filed on Jul. 27, 2011, provisional application No. 61/451,403, filed on Mar. 10, 2011, provisional application No. 61/437,444, filed on Jan. 28, 2011, provisional application No. 61/451,392, filed on Mar. 10, 2011.

(51) Int. Cl.
*A63F 9/24* (2006.01)
*A63F 13/00* (2006.01)

(52) U.S. Cl.
USPC .................................. 463/17; 463/25; 463/42

(58) Field of Classification Search
USPC .............................. 463/16–20, 25, 29, 40–42
See application file for complete search history.

(56) References Cited

U.S. PATENT DOCUMENTS

| | | | | |
|---|---|---|---|---|
| 5,365,575 | A * | 11/1994 | Katz | 379/93.13 |
| 5,772,511 | A * | 6/1998 | Smeltzer | 463/17 |
| 6,824,464 | B2 * | 11/2004 | Weil et al. | 463/17 |
| 7,788,482 | B2 * | 8/2010 | Irwin, Jr. | 713/155 |
| 2001/0033689 | A1 | 10/2001 | Meder | |
| 2001/0049305 | A1 * | 12/2001 | Riendeau et al. | 463/42 |
| 2002/0090985 | A1 * | 7/2002 | Tochner et al. | 463/1 |
| 2003/0045340 | A1 * | 3/2003 | Roberts | 463/17 |
| 2004/0176158 | A1 * | 9/2004 | Baldwin | 463/17 |

(Continued)

FOREIGN PATENT DOCUMENTS

| | | |
|---|---|---|
| EP | 1622104 A2 | 2/2006 |
| JP | 2004227547 A | 8/2004 |

(Continued)

*Primary Examiner* — Milap Shah
(74) *Attorney, Agent, or Firm* — Adrian D. Battison; Ade & Company Inc

(57) ABSTRACT

Apparatus for playing game by a plurality of players includes a set of instant win tickets and a programmed computer system creating a web site associated with the tickets to be accessed by the players. The system provides an app to be downloaded providing access to the site by the remote terminal of those players having the app. A computer controlled validation data base contains the status of each of the set of tickets and the system provides communication with the validation data base. The players can use their terminals to enter information relating to the playing of the game which is communicated to the remote terminals of one or more of others of the players.

9 Claims, 2 Drawing Sheets

(56) References Cited

U.S. PATENT DOCUMENTS

| | | | | |
|---|---|---|---|---|
| 2004/0204222 | A1* | 10/2004 | Roberts | 463/17 |
| 2004/0229677 | A1* | 11/2004 | Gray et al. | 463/17 |
| 2005/0164779 | A1* | 7/2005 | Okuniewicz | 463/25 |
| 2005/0197968 | A1* | 9/2005 | Das et al. | 705/64 |
| 2005/0203854 | A1* | 9/2005 | Das et al. | 705/64 |
| 2006/0025222 | A1* | 2/2006 | Sekine | 463/42 |
| 2006/0094504 | A1* | 5/2006 | Polchin | 463/36 |
| 2006/0172799 | A1* | 8/2006 | Kane et al. | 463/25 |
| 2006/0223627 | A1* | 10/2006 | Nozaki et al. | 463/20 |
| 2007/0026926 | A1* | 2/2007 | Romanik | 463/17 |
| 2007/0117609 | A1* | 5/2007 | White et al. | 463/17 |
| 2007/0218980 | A1* | 9/2007 | Pachnis et al. | 463/25 |
| 2007/0238505 | A1 | 10/2007 | Okada | |
| 2007/0239823 | A9* | 10/2007 | Pachnis et al. | 709/203 |
| 2008/0045298 | A1* | 2/2008 | Yoshizawa | 463/17 |
| 2008/0045299 | A1* | 2/2008 | Bennett et al. | 463/17 |
| 2008/0174068 | A1* | 7/2008 | York et al. | 273/139 |
| 2008/0182561 | A1* | 7/2008 | Kim et al. | 455/414.2 |
| 2008/0220840 | A1 | 9/2008 | Katz et al. | |
| 2009/0023490 | A1* | 1/2009 | Moshal et al. | 463/17 |
| 2009/0042631 | A1* | 2/2009 | Randhawa | 463/17 |
| 2009/0061980 | A1* | 3/2009 | Holton et al. | 463/17 |
| 2009/0108057 | A1* | 4/2009 | Mu et al. | 235/375 |
| 2009/0149239 | A1* | 6/2009 | Youssef et al. | 463/17 |
| 2009/0197662 | A1* | 8/2009 | Wright et al. | 463/17 |
| 2009/0289764 | A1* | 11/2009 | Chiu | 340/10.1 |
| 2009/0309352 | A1* | 12/2009 | Walker et al. | 283/100 |
| 2010/0069136 | A1* | 3/2010 | Safaei et al. | 463/17 |
| 2011/0032078 | A1* | 2/2011 | Guziel et al. | 340/5.86 |
| 2011/0034230 | A1* | 2/2011 | Guziel et al. | 463/17 |
| 2011/0059786 | A1* | 3/2011 | Walker et al. | 463/17 |
| 2011/0086692 | A1* | 4/2011 | Guziel | 463/17 |
| 2011/0105213 | A1* | 5/2011 | Irwin et al. | 463/17 |
| 2012/0202571 | A1* | 8/2012 | Stanek et al. | 463/17 |
| 2012/0202572 | A1* | 8/2012 | Stanek et al. | 463/17 |

FOREIGN PATENT DOCUMENTS

| | | | |
|---|---|---|---|
| JP | 2005070866 | A | 3/2005 |
| JP | 2008152683 | A | 7/2008 |
| KR | 2003-0006762 | A | 1/2003 |
| WO | WO 2005/001628 | A2 | 1/2005 |

* cited by examiner

METHOD OF PLAYING A LOTTERY GAME INCLUDING A GROUP-BASED SECOND CHANCE GAME

PRIORITY CLAIM

This application is a continuation-in-part of application Ser. No. 12/783,791, filed May 20, 2010, which corresponds to Canadian Application 2,704,075, filed May 20, 2010. This application also claims benefit of priority under 35 U.S.C. 119 to Provisional Application No. 61,437,444 filed Jan. 28, 2011, Provisional Application No. 61/451,403 filed Mar. 10, 2011, Provisional Application No. 61/512,262 filed Jul. 7, 2011 and Provisional Application No. 61/180,968 filed May 26, 2009, the disclosures of which are incorporated herein by reference.

FIELD OF INVENTION

This invention relates to a game apparatus including one or more sets of tickets and including network communication of information on the game to other players.

BACKGROUND OF THE INVENTION

Instant scratchoff lottery tickets were first introduced in the late '70's and since their initial introduction sales of the product have grown, both as a result of the entry of new government lotteries and the expansion of different products, which appeal to a broader range of players.

However in recent years the level of growth seen during the '90's has slowed. The change is the result of many factors including a decline in the entry of new lotteries as the majority of state and provincial governments have introduced lotteries previously. Additional factors are the change in global economic conditions and the shift in demographics.

Instant scratchoff tickets have historically been primarily an impulse purchase by an individual player when they are in a retail location to purchase other commodities, such as fuel, food, beverages, etc. In order to maintain and increase player interest significant effort has been expended by the different instant lottery ticket manufacturers, since the introduction of the tickets, to introduce new and exciting graphics and play features designed to entice the retail customer to purchase one or more tickets during their visit. The results of these efforts have achieved the desired result and have contributed to the continued growth of the industry over the past three decades. These innovative features continue to appeal to the existing player and development efforts in this regard will continue.

While these features have resulted in enhanced appeal to the existing player base they have not been successful in attracting the next generation of potential players. As a result the typical instant scratchoff player is aging and sales to this group are expected to decline in the future.

In order to achieve this directive it will be necessary to develop instant scratchoff lottery products and processes that will continue to appeal to the existing player but will attract the younger demographic on an ongoing basis in order to become a stable demand for that sector of the market.

SUMMARY OF THE INVENTION

It is one object of the invention to provide a game apparatus including sets of game tickets where there is provided a separate computer system associated with the tickets where the players are associated to communicate with other players and to associate in groups.

According to one aspect of the invention there is provided an apparatus for use in a game to be played by a plurality of players, the apparatus comprising:

- at least one set of tickets arranged for playing a lottery game;
- a programmed computer system providing:
  - communication through a network with remote terminals each associated with one of the plurality of players;
  - a site accessible by the remote terminals;
  - a sub-program for entering registration of a player entering the site and for communicating with the remote terminal of the player and optionally with retailers;
  - a sub-program generating one or more groups of the registered players and causing association of selected ones of the players in a selected one of the groups.

The games concerned are preferably instant win type games where the result is entirely predetermined, since such games are generally preferred in a lottery situation in order to ensure that the total winnings is predetermined. However the present invention is not limited to the type of game to be played and can include probability or other games which include game indicia covered by a scratch-off coating.

The construction may also be used in situations where the main objective is for other purposes than gambling such as in promotional games or games of fun for children or others where no gambling or prizes are involved.

Many such tickets are used directly in a lottery situation so that the tickets have no other relevance other than the playing of the lottery or game by which the player may win monetary or other prizes as part of the lottery or gaming situation.

However more attention has been recently given to the use of such tickets as promotional items used by manufacturers of other products to enhance the sale of the product.

Preferably the game data on each ticket defines an instant win game revealing whether the player is a loser or a winner of a prize and if so the value of that prize. Preferably the covering is a scratch-off layer typical with instant win tickets but it can be provided by other types of removable covering. Also the game can be other types of game such as a simple draw, a game of no prize value or even probability type games where the result is determined by the actions of the player.

Preferably the site is a web site and communication through the internet is provided to that site. However the present invention contemplates other forms of communication and that the site has characteristics suitable for that mode of communication.

The lottery tickets can be of the instant win type where there is a substrate having printed thereon, in one or more areas, game data covered by one or more areas of scratch-off coating which can be removed by a player to expose the game data revealing whether the player is a winner of a prize and if so the value of that prize.

Alternatively the set of lottery tickets could include lotto-style tickets in which the player or computer system, on behalf of the player, pre-selects a series of numbers for a draw to be held at a later date. Once the numbers are selected, the computer system prints a ticket for the player and adds that sequence and related information to a data base for verification purposes post-draw.

The tickets concerned can include pull tabs, conventional bingo paper products and non-lottery promotional games.

The association of a player with a group can be selected by the player themselves to associate in groups of common interest or commonly known to one another. Alternatively the association of a player with a group can be selected by entry of a location or residence of the player so that for example the group contains all players within a selected geographical area. As another possibility, the association of a player with a group can be selected by other factors known by the computer system such as by time of entry by the player of a winning ticket.

In order to encourage membership of use of the system and the site associated therewith preferably the programmed computer system is arranged to generate a second chance prize. To encourage group participation, the prize can be paid to all members of a winning group. Also the system can provide other rewards to a player for fostering group participation by other players in the group. Also the system can provide other rewards to a player for introducing other players into the group. Also the system can provide other rewards when another member of the group wins a prize.

The term "second chance game" can include a variety of game styles that can be played under the designation as a second chance game and this is not limited to the type of game in which a random draw is made from all entries from a single game.

For example the second chance game can include random awards, such as the last X people that registered a ticket from this game receive a share of a prize or coupons for a free ticket. Another concept is for the ticket to feature a single digit, letter, etc. Participants enter their ticket info, including this character within the group.

As another encouragement to use the system, the programmed computer system can be arranged to share information on the tickets with players associated with the group to enable strategic purchase of tickets by the players within the group.

As another encouragement to use the system, the programmed computer system can be arranged to provide a second chance group game to be played commonly by members of the group, such as for example using material or data obtained from tickets purchased by members of the group.

Preferably there is provided a sub-program defining an app (application) arranged to be downloaded into the remote terminal of each one of the players providing access by the remote terminal of that player to the site.

Preferably there is provided a computer controlled validation data base containing data relating to the set of lottery tickets and those tickets thereof which have been played by the players to win a prize and the value of that prize and the programmed computer system provides communication with the computer controlled validation data base.

Preferably the programmed computer system is arranged for entering information from the remote terminal of a player entering the site, the information relating to the playing of the game and provides a sub-program for communicating the entered information from the player to the remote terminal of one or more of others of the players.

According to one aspect of the invention there is provided an apparatus for use in a game to be played by a plurality of players, the apparatus comprising:

- at least one set of tickets, either instant scratchoff or lotto style;
- a programmed computer providing:
  - communication through a network with remote terminals each associated with one of the plurality of players;
  - a site accessible by the remote terminals;
  - a sub-program or program component defining an app arranged to be downloaded into the remote terminal of each one of the players providing access by the remote terminal of that player to the site.

Preferably the programmed computer system is arranged such that access to the site through the app is provided by a code printed on one of the tickets.

Preferably the programmed computer system is arranged to communicate information relating to the ticket to all remote terminals which have downloaded the app.

According to one aspect of the invention there is provided an apparatus for use in a game to be played by a plurality of players, the apparatus comprising:

- at least one set of game tickets, either instant scratchoff or lotto style;
- a programmed computer system;
- a computer controlled validation data base containing data relating to the set of lottery tickets and those tickets thereof which have been played by the players to win a prize and the value of that prize;
- the programmed computer system providing:
  - communication through a network with remote terminals each associated with one of the plurality of players;
  - communication with the computer controlled validation data base.

Preferably the programmed computer system is arranged to obtain information from the computer controlled validation data base as to which prizes of the game have been won. That is there can be provided a plurality of sets of different tickets each providing a different game and wherein the programmed computer system is arranged to obtain information from the computer controlled validation data base as to the status of prizes already won and still outstanding in all of the sets. This allows the players access to the information allowing strategic purchasing of tickets. Thus preferably the programmed computer system is arranged to communicate status of prizes already won and still outstanding to the remote terminals for all players to see. In addition, preferably the programmed computer system is arranged to communicate information relating to the location of tickets for sale in a geographical area so that the players are encouraged to purchase. The communication can be arranged as unsolicited messages transmitted as texts or emails to the remote terminals, typically the ubiquitous smart phones.

According to one aspect of the invention there is provided an apparatus for use in a game to be played by a plurality of players, the apparatus comprising:

- at least one set of tickets, either instant scratchoff or lotto style;
- a programmed computer system providing:
  - communication through a network with remote terminals each associated with one of the plurality of players;
  - a site accessible by the remote terminals;
  - a sub-program for communicating with the remote terminal of the player and for entering information from the remote terminal of a player entering the site, the information relating to the playing of the game;
  - a sub-program for communicating the entered information from the player to the remote terminal of one or more of others of the players.

For example the information communicated to the other players relates to:

- location of purchase of a winning ticket or player's position.
- the prize of a winning ticket or a generic indication that a win did occur with disclosure of the value being withheld by the player for privacy reasons.
- the identity or avatar of a player of a winning ticket.

The information can be entered directly by the player into the remote terminal as a response to a prompt by the system or can be entered automatically by the remote terminal such as by GPS location or other scanned material or from other sensors.

For example the information relates to comments on the game by the player or player/ticket preferences.

The players to whom the information is communicated can be selected from an identified group rather than the whole complement of players registered with the site. This can be the group to which the player has selected to belong, a group determined by location of the players, a group determined by a time of entry of a winning ticket or a group formed using other criteria.

Preferably the programmed computer system is arranged such that the information entered is taken from authentication data printed on the ticket.

Preferably the programmed computer system is arranged such that registered players can play a second chance game or other form of game as conceived by the lottery as part of the encouragement or motivation to register. For example the second chance game can provide a prize dependent upon the number of players in the group.

In addition the system can be arranged to communicate to players though another communication medium such as other social media.

It is therefore a significant advancement in the expansion of the lottery marketplace to support continuation of the growth of lottery revenues and which appeals to a broader range of instant player. In order to achieve these results, especially in regards to the younger demographic, it means a change in how tickets are purchased and played, including alternative or extended internet-based play and increased social interaction. While the changes are being introduced it will be necessary to maintain impulse purchase motivation and the current player group.

The changes herein provide methods which utilize new and existing social networks to generate the desire to purchase instant tickets, based on the inter-change of information provided by other users versus conventional impulse buying when in a retail location. Exchange of information involved in this effort includes:

- individual player results including winning information;
- optional player/ticket preferences;
- geographical information relating to winning retail locations including game and prize values;
- game information relating to the remaining prize pool;
- geographic and inventory information relating to retailers within a geographic region at which tickets are available for sale for specified games;
- individual rewards for fostering group participation;
- group participation towards shared prizing.

The strategic purchase concept will be enhanced by different methods designed to reward the instant scratchoff player for their efforts in self-promotion of the various products to their friends and associates.

Further incentives are provided which result in shared benefits between the group members in order to foster continued expansion and benefits.

Different aspects of the invention are as follows:

Method to utilize social network to promote game experience by the player. After completion of play on a conventional ticket, the player scans a code (QR code or other format) located on the ticket, point of sale material, advertisement, etc. using a smart phone or other mobile device.

If the code is located on the ticket, it may be unique or generic and in addition may be covered by scratch off material. To scan the code, the player uses an app, which is downloaded from the lottery or other source. Once the link is established, the player is required to register if new or log into an existing account.

The player may have an individual account or participate in an account with a pre-determined group of "friends". Once the log in or registration is complete player may enter comments as to play experience, preference and optionally provide a photo of the ticket or themselves.

The player is also prompted to enter geographic location for the retailer or their current location or to allow the mobile device to make this determination. This process may be automated with the retailer-specific information being embedded in the codes positioned on the point-of-sale material at a specific retailer or alternately could be determined, through the lottery inventory data-base if the code on the ticket is unique or through the GPS feature on the mobile device itself.

If the player is part of a group then their commentary, retailer information, etc. can be posted on a social media website(s) for all of their "friends" and other users.

The web site also provides a method to authenticate and distribute winning information. If the ticket is a potential winner, then the player identifies this during the log-in process. The player is prompted to enter ticket validation information, located on the ticket, in order to authenticate the ticket. Data entry may be automated via scan capability if the ticket features a unique code or manual. Once the authentication process is complete and accepted, if the instant ticket is a winner, the operator (PBL or lottery) is notified of the win and geographic location. The player selects an avatar or take a photo of themselves, their ticket or some other object to create a visual image that represents them. The photo can be taken using their mobile device or a device at the retail location. Alternatively, the photo could be set at the time of the app download and regularly updated if desired. This image is uploaded, possibly along with their username and location (general location such as city, zip code area, etc., or a specific location) and posted to any number of displays including:

- social media website(s) for sharing with the player's friends and other users of those websites;
- lottery website, lottery social media sites and lottery player's club: the wins (both # of wins and $ value) may be shown as cumulative totals. Mid and high tier wins may also be displayed as distinct messages for a predetermined period;
- lottery digital advertising displays in proximate retail locations or all retail locations for other players to see, prompting more purchases based on the success of other players;
- digital billboards within a predetermined distance from the purchase location;
- sent out to users who have downloaded the app.

The lotteries may, in addition utilize an augmented reality component where the mobile device shows the player where the winners are in their area, by neighborhood, zip code, city, etc., and where the retailers are located within the targeted location.

The map feature of the mobile device could display all wins in that geographic area. Potentially, the player's friends and their retailers could be indicated by use of a special icon. The map could be used as the graphic of the landing page so anyone who visits the site sees the winners.

The web site also provides a method to promote strategic ticket purchases based on unclaimed winning information where the site is used to communicate information on the status of the game.

The web site also provides the possibility to expand ability of lotteries or organizers to use augmented reality to enhance the experience beyond the use described herein. That is the lotteries may, in addition utilize an augmented reality component to enhance the experience such as where the mobile device shows the player within the targeted location.

The web site also provides the option of collecting points as a form of reward. That is points can be collected via different routes including: visiting retail locations and entering location specific info via scanning a code displayed on POS material, mobile device GPS or other means; completing surveys or participating in focus groups. In this regard reference is made to copending Provisional Application 61/437,444 filed Jan. 28, 2011 by the present Assignee, the disclosure of which is incorporated herein by reference.

The web site can use alternate methods of game play, for example: use of computer-generated tickets which are played on the mobile device; electronic scratch tickets which simulate conventional play, that is scratching, pulling off a tab, etc. to reveal a win status and scanning of a code only etc.

Through ticket validation system the lottery is able to identify in real-time the status of all potential winners within the game and whether they have been redeemed. This is especially important for mid to high tier winners. On a separate inventory control system, which operates independent of the validation system the lottery also knows how many books of ticket are currently available and the retailer locations, who have inventory available for a specific game.

As a game proceeds, the site acts to post information on social networks to all registered participants on a game by game basis concerning the outstanding prize pool and the quantity of tickets books available at specific retailers within a geographic location, neighborhood, work, city, etc. Players are able to track the results and to make decisions as to which tickets they will purchase based on the outstanding prizes and identify retailers within their geographic region where tickets are available for sale. If a game is approaching the end and there is still a disproportionate numbers of winners outstanding then this information can be utilized to plan purchases based on an odds of winning which may greater than the odds posted for the game itself.

The web site also provides a method for "Share the Wealth" feature that encourages and facilitates group play and/or the sharing of prizes among established friends/groups. There are a variety of different formats that could be followed to Share the Wealth.

This can be in a pyramid style where a group is established by 1 player who invites friends to participate with them in pooling of their 2nd chance or other game winnings. Groups can be ongoing and cover all available tickets or can be established for one game only. Friends are required to download the app, play the game(s) and enter their tickets. When they register, players have to identify the group they wish to join including the name of the friend that invited them. Once the entry process is complete their profile will be linked to the player who invited them. If any of original player's friends win from the instant game and authenticate their ticket through the lottery app, that player also receives a prize or coupon for a free ticket, etc.

Optionally, the reward concept can be extended down to lower levels as the group expands so that there could be multiple tiers. All the tickets entered into the 2nd chance draw or alternative style of game by any and all members of this group of players will be for the benefit of the members of the group. Winnings may be restricted to those who have entered ticket(s). Winnings may be proportionate to the number of entries by each individual. The amount of the prize to be awarded could be pre-determined or may vary by the number of entries posted by that group, e.g. prize table:

| # of entries by group | Prize value to be shared by group members |
|---|---|
| 10 | $1000 |
| 20 | $5,000 |
| 50 | $15,000 |
| 100 | $50,000 |

Alternatively, the amount of the prize could be determined by the number of members in a group. There may be a leaderboard or chat board that tracks the status of each group, generating competition between groups.

The group could also function without the rewards for the player(s) extending the invitation and all benefits are shared equally by the participants.

Other types of groups can be formed, some of which do not require prior registration and could be determined up to the time of the draw. Examples of these types of groups could be:

- all users that purchase a ticket from the same retailer share proportionately in the 2nd chance draw prize(s);
- all active users within the defined geographic space (e.g. zip code area) share proportionately in the 2nd chance draw prize(s);
- all players that purchase a ticket within a defined time period share proportionately in the 2nd chance draw prize(s);
- random awards, such as the last X people that registered a ticket from this game receive a share of a prize or coupons for a free ticket;
- all retailers that have sold some number of tickets from this game within a defined geographic space or within a defined time period.

In order to be able to participate in these types of draws, the player may be required to enter their ticket information in a timely manner possibly including retailer location, etc. The award of prizes is designed to reward players for their active participation.

The "Share the Wealth" jackpot could be separate from the prizes associated with the physical ticket, and could take the form of a rolling jackpot that accumulates as the number of participants or qualifying purchases increase. When opting in for "Share the Wealth", the user registers their picture or avatar and username. Optionally, the "Share the Wealth" feature could require the player to pay an additional sum of money to opt in, and this sum or a portion thereof is added to the rolling jackpot.

Alternatively, the "Share the Wealth" jackpot could be incorporated into the regular prize structure. The jackpot could be insured if significantly less than 100% redemption of the Share the Wealth prizes is expected.

The web site also provides methods for group play. Group play is an important component and reinforces the sharing of information amongst participants beyond the Share the Wealth format.

Players are encouraged to invite others to participate in a game or series of games, and will benefit from having others register, play, enter into related draws and/or participate in some way. When another person participates, they will be linked to the original player. The link between players will exist for that particular game(s) and associated draws, etc. or for a series of games.

As players participate or are successful in winning on instant games, the player who initiated the group may also benefit through the awarding of free tickets, coupons, credits, etc.

Alternatively benefits that are accrued as a result of participant activities could be pooled and applied to the group collectively.

The group play experience could be motivated by the use of a time component, that is if X users enter a ticket in the next Y minutes, they get a bonus coupon, free play, fun animation or other added value opportunity Physical tickets could be designed which offer play features which encourage players to work together in order to achieve a common prize. In its simplest form, the ticket may feature a collectable section in which different elements from several tickets have to be collected in order to qualify. One example could be a photograph which has been subdivided into several individual components, one of which is be printed on each ticket and covered with scratchoff. Groups pool their findings in order to increase their chances of finding a winning result.

Another concept is for the ticket to feature a single digit, letter, etc. Participants enter their ticket information, including this character within the group. Once entered the individual digits are linked based on the time entered to form a string of numbers. The string grows as the number of entries increases. At some point the entry process stops for all groups and the lottery randomly generates a winning number. If the group's accumulated number contains that particular string of numbers in consecutive order, they are eligible to win the associated prize. Odds of winning will depend directly on the number of accumulated entries.

Alternately prizing could be based on the string of numbers in order across the entire range, which would increase the odds of winning. Another alternative would be to print 2 numbers on each ticket from a pre-determined range (i.e. 00-49) and to provide an automated entry into a future on-line lotto draw for every set of numbers (i.e. 6 that the groups acquires)

Other types of schemes would utilize the same concept. For example each ticket could feature a playing card which is entered and a poker hand is automatically created once the predetermined set is accumulated (i.e. 5). Winnings could be based on pre-determined hands or the lottery could randomly generate a "Hand to Match" after the closure of entries to avoid groups collecting cards without entering them in order to build hands.

Alternatively as group participants enter ticket information they are provided the opportunity to select a number, letter, etc. at random and these selections are combined in order to create the string of characters outlined above. There are of course several different variations to this type of theme which can be implemented.

That is the programmed computer system is arranged to provide a group game in which a winning status is determined using components from different players of the selected one of the groups, which components are combined. Thus the group game can be played using material or data obtained from tickets purchased by members of the selected one of the groups.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
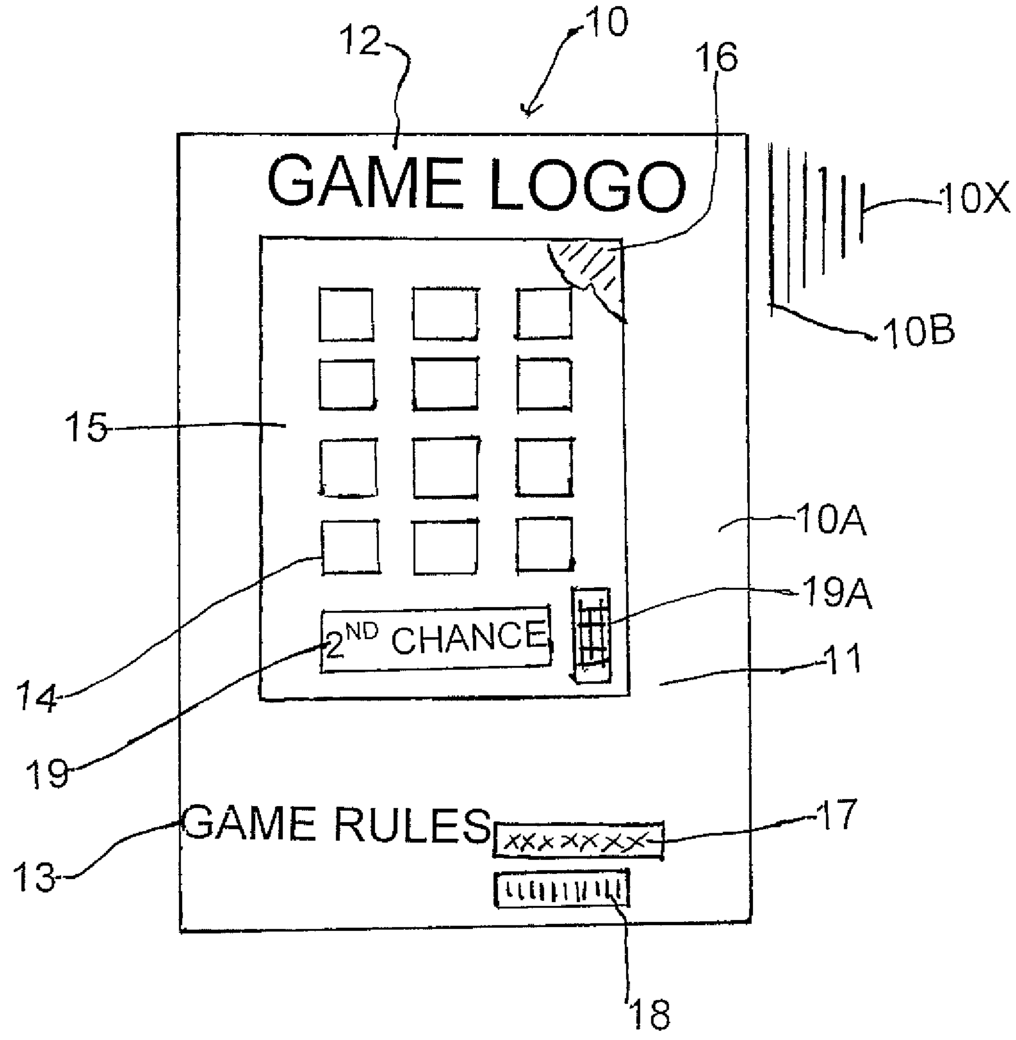
FIG. 1 is a plan view of a lottery ticket forming one part of an apparatus according to the present invention.
Figure 2:
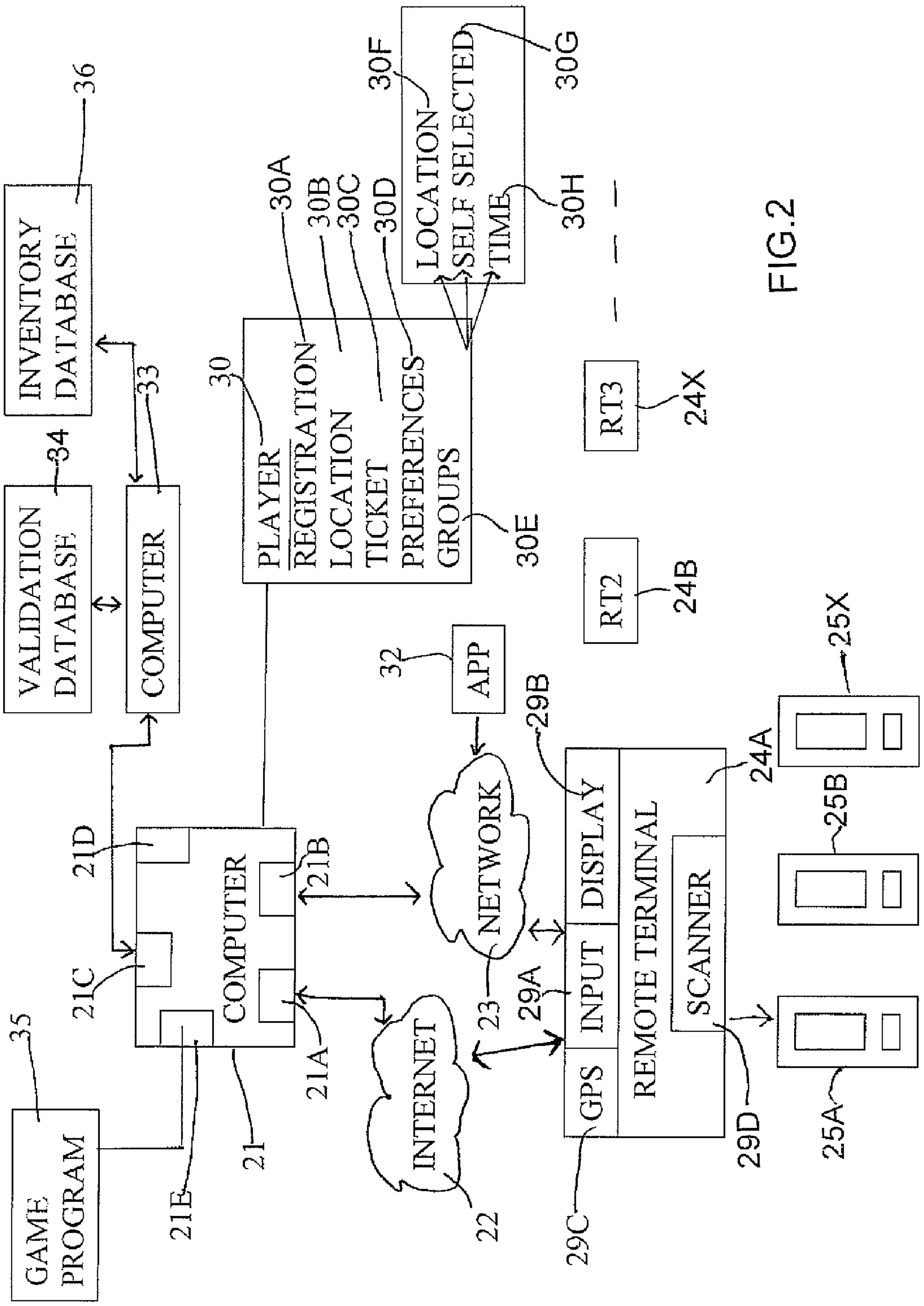
FIG. 2 is a schematic illustration of a computer system forming a second part of an apparatus according to the present invention.

The apparatus shown in FIGS. 1 and 2 for use in a lottery game to be played by a plurality of players includes a set of lottery tickets 10 shown in FIG. 1 and a programmed computer system shown in FIG. 2.

The set of lottery tickets includes a plurality of individual tickets 10A, 10B to 10X. The number of tickets can vary but typically the tickets are formed in books making up a complete set for a particular game. The books are provided as individual items to be sold by retailers to the public. Depending on the longevity of the game, the number of books can be large with many re-printings or can be much smaller for specific dedicated games. All the tickets of one set relate to a particular lottery game which has winning and losing tickets where the winning tickets can carry prizes of different levels from low tier prizes of a few dollars to high tier prizes which can be very large. Typically different protocols are used to redeem small and large prizes.

Lotteries of this type are managed by Lottery Organizations and they typically retail a number of different games through the retailers. Thus additional sets of tickets for different games will be available in the Lottery system managed by a management system including various data bases. In particular the system includes a computer controlled validation data base as part of a validation system where the holder of a winning ticket can provide the ticket to a terminal at a retailer and determine whether the ticket is confirmed as a winning ticket and if so what is the prize value associated with the ticket.

Each ticket is formed of a substrate having printed thereon various information necessary for the game to be played. This includes a game logo 12 and game rules 13 which set out the basis by which the winning and losing status of the ticket is instantly determined from game data 14 including a level of prize for a winning ticket. Many different arrangements for such instant win tickets are well known to a person skilled in the art.

The game data 14 is printed in a game area 15 using printing techniques well known to a person skilled in the art and is covered by a scratch-off layer 16 also well known.

The ticket further includes a validation number 17 and a bar code 18 related to the validation number allowing these to be used to validate any prize claimed by a player after playing the game by exposing the game data. The bar code and validation number can left exposed or be covered before playing by a second area of scratch-off or by the same area 16. If the barcode and validation number are exposed then the validation number is incomplete. To ensure security some of the digits from the validation number are hidden from view under scratchoff. If a barcode is hidden then it would contain all of the necessary data to complete the validation process.

The game data 14 is thus covered by an areas of scratch-off coating 16 which can be removed by a player to expose the game data with the exposed game data including an instant win game revealing whether the player is a winner of a prize and if so the value of that prize.

A section 19 of the tickets dedicated to information relating to an associated web site to be accessed for second chance play or other form of game or for information exchange. This gives to the player the information necessary for the player to optionally enter the second chance game system managed on the web site. A code 19A is also printed onto the ticket in the game area which can be read and decoded using a mobile phone or similar camera device which allow the code to be entered into a program for decoding either on the device or remotely. This can be used to provide automatic access to the web site from the scanning phone system.

As shown in FIG. 2 there is provided a computer system which provide the web site identified on the ticket.

This comprises a control computer 21 which communicates through the Internet 22 and/or through a phone network 23 with a respective one of a plurality of remote terminals 24A, 24B to 24X each associated with a respective player of a respective ticket 25A, 25B to 25X, after playing the game of the ticket, wishing to enter the web site.

The computer 21 includes a sub-program 21A for entering registration of personal details of a player entering the web site and for storing data identifying each player in a data base 25.

The apparatus therefore includes the programmed computer system 21 which includes a communication sub-program 21A and 21B for communication through the internet and through a separate telephone network. The computer therefore provides the site accessible by the remote terminals 24A to 24X. The remote terminals 24A are typically conventional smart phones which provide an input 29A, a display 29B, a GPS location system 29C and a camera scanning system 29D.

The computer further provides a sub-program 21D for entering registration of a player entering the site by communication with the remote terminal of the player. The sub-program 21D operates the management of the second chance game system and the registration of all player and ticket details when entered by the player. Thus the sub-program receives and stores information from the player remote terminal which identifies the registration details of the player 30 at 30A.

It also stores information relating to the location 30B of the player which is typically the site at which the player purchases a ticket which forms the basis of the entry but can also be the main residence of the player, current location, etc. This can be entered by the player directly in response to a prompt through the communication protocol, or can be entered by the GPS system 29C of the terminal 24A, or it can be entered by data scanned from the ticket in the code 19A which can be used to identify the retailer location.

It also stores information relating to the winning ticket 30C of the player. This information can be entered by the player directly in response to a prompt through the communication protocol, or it can be entered by data scanned from the ticket in the code 19A which can be used to identify the specific ticket.

It also stores information relating to ticket and player preferences 30D of the player. This information can be obtained by analysis of the player's entries from tickets played, or it can be entered by the player in response to a prompt.

It also stores information relating to groups 30E to which the player is determined to belong. This information can be obtained by analysis of the player's entries from tickets played, or it can be entered by the player at 30G in response to a prompt. Or it can be determined by the system for example at 30F by associating in groups the players using a particular retailer location or set of retailer locations within a particular area. Or it can be determined by the system for example by associating in groups the players entering a winning ticket at a particular time range at 30H.

Thus the sub-program generates one or more groups 30E of the registered players and causes association of selected ones of the players in a selected one of the groups based on selection criteria determined by the system.

In order for the terminals 24A to communicate with the site defined by the computer 21 though the network 23, it is necessary for a sub-program defining an app 32 to be downloaded into the remote terminal of each one of the players on request providing access by the remote terminal of that player to the site.

The lottery system also includes a computer controlled validation system, including a computer 33 and a data base 34, and provides communication between the computer 21 and the computer 33.

This can be used to obtain information from the computer controlled validation data base 34 as to which prizes of the game have been won and to the status of prizes already won and still outstanding in all of the sets of the games.

The system also provided the sub-program 21B for communicating the entered information from the player to the remote terminal of one or more of others of the players. The information can be as previously described including the purchase of a winning ticket, the prize of a winning ticket, the identity or avatar of a player of a winning ticket, comments on the game, player/ticket preferences. The players to whom the information is communicated form an identified group. The programmed computer system is arranged such that registered players can play a second chance game which provides a prize dependent upon the number of players in the group.

The system can communicate to players though the network 23 to the smart phones of the players or through another communication medium such as facebook. The communication is typically provided as unsolicited messages In addition to the prize information from the computer 33, the same source, through a separate inventory data base 36, can also provide information relating to the location of tickets for sale in a geographical area where tickets for a specific game remain available.

The game management system is shown schematically at 35 on which the ticket control and the management of second chance games or draws including prizes and modes of payment of those prizes to members of a group are determined and controlled.

The invention claimed is:

1. A method of playing a lottery game by a plurality of players, the method comprising:

providing a series of physical lottery tickets arranged to be sold to the plurality of players for dispensing of lottery funds to the plurality of players, wherein each of the plurality of physical lottery tickets having game data printed thereon and covered by a covering that can be removed to expose the game data, and wherein each of the plurality of physical lottery tickets are instant win tickets in which the game data, when exposed by removing the covering, provides a game status which is either a winning status with a prize or a losing status;

providing a first computer-based apparatus, at a retail location, configured to validate and redeem one or more of the physical lottery tickets having a winning status, the first computer based apparatus having access to a database that contains validation data associated with all of the physical lottery tickets having a winning status to facilitate said validation and redemption;

providing a second computer-based apparatus that maintains a website related to the lottery game;

enabling at least one of the plurality of players to access the website by scanning material printed on at least one of the plurality of physical lottery tickets using a camera module of a personal communication device, thereby generating information defining the website;

enabling direct communication between the personal communication device and the website in order to communicate additional game data from the website to the personal communication device;

enabling at least one of the plurality of players accessing the website to register on the website, thereby defining the at least one player as a registered player, so as to create a database of multiple registered players;

creating, by the second computer-based apparatus, a plurality of groups, each of the groups including two or more of the multiple registered players;

providing on the website, via the second computer-based apparatus, a second chance game to be played together by players who are members of a selected one of the plurality of groups, the second chance game being associated with a second chance prize;

sharing the second chance prize, upon winning in the second chance game, with two or more of the registered players associated with selected group; and enabling communication of received information communication from one or more registered players with one or more other registered players of a common group of the plurality of groups, wherein at least some of the received information being communicated when the personal communication devices of the one or more registered players are not in said direct communication with the website, and said received information being communicated through a medium different from said direct communication with the website.

2. The method of claim 1, wherein during creating, by the second computer-based apparatus, of the plurality of groups, a registered player selects one of the plurality of groups to join.

3. The method of claim 1, further comprising:

enabling one of the plurality of players to enter information into the website related to a physical location of the player, and causing the player to be automatically join one of the plurality of groups based on the physical location.

4. The method of claim 1, further comprising:

enabling one of the plurality of players to enter information into the website related to one of the physical lottery tickets, and causing the player to be automatically join of one of the plurality of groups based the entered information related to one of the plurality of physical tickets.

5. The method of claim 1, further comprising:

providing an introduction award to one of the plurality of players as a reward for introducing one or more other players into the selected group of the plurality of groups, the introduction award being separate and in addition to any other games or awards on the website.

6. The method of claim 1, wherein the second computer-based apparatus is arranged to share information on the plurality of physical tickets with registered players associated with the selected group of the plurality of groups to enable strategic purchase of tickets by the registered players within the selected group.

7. The method of claim 1, wherein the second computer-based apparatus is arranged to provide the second chance game in which a winning status is determined by combining components from different players within the selected group.

8. The method of claim 7, wherein the second chance game is played using material provided by the registered players or data obtained from one or more of the plurality of physical tickets purchased by the registered players within the selected group.

9. The method of claim 7, wherein there is provided a computer program component defining an application, arranged to be downloaded into a remote terminal of one or more of the plurality of players, providing access by the remote terminal to the website.

* * * * *